INVENTOR
GEORGE H. BOWSER
ATTORNEYS

United States Patent Office 3,423,488
Patented Jan. 21, 1969

3,423,488
PROCESS FOR CASTING RESINOUS LENSES IN THERMOPLASTIC CAST REPLICA MOLDS
George H. Bowser, New Kensington, Pa., assignor to PPG Industries, Inc., a corporation of Pennsylvania
Continuation-in-part of application Ser. No. 415,055, Dec. 1, 1964. This application May 11, 1966, Ser. No. 549,278
U.S. Cl. 264—1
Int. Cl. B29d 11/00
5 Claims

ABSTRACT OF THE DISCLOSURE

This invention relates to a method of producing thermosetting resinous articles in a thermoplastic resinous replica mold in the substantial absence of oxygen. The invention particularly relates to a method of producing thermosetting resinous articles which comprises producing a thermoplastic resinous replica mold from a master pattern from the article, introducing a thermosetting resinous material such as an unsaturated alcohol ester of a polybasic acid into the replica mold, heating the filled mold to cure the thermosetting material, and removing the cured article from the mold wherein the heating and curing of the thermosetting material is conducted in a substantial absence of oxygen, for example, by the presence of a gaseous atmosphere containing substantially no oxygen or by sealing the periphery of the thermoplastic mold so that it is substantially impermeable to the gases surrounding the mold. The invention is particularly applicable to the production of thermosetting resinous lenses for optical purposes.

---

This application is a continuation-in-part of my application Ser. No. 415,055 filed Dec. 1, 1964.

A plastic lens is conventionally manufactured by casting a thermosetting resin in a rigid glass mold. Typical processes are described in U.S. Patent Nos. 2,542,386, 2,964,501, 3,038,210, 3,070,846 and 3,136,000. The mold consists of two glass mold sections separated by a flexible, compressible gasket. These sections have opposing ground and polished curved surfaces which form a cavity for forming the lens.

This process requires a careful assembly of the sections and the flexible gasket. The cavity is then filled with the resin and the filled mold is subjected to heat to cure the resin in the mold. This may be done by injecting a metered amount of the curable resin between the mold sections to fill the cavity formed between the mold sections.

The resin shrinks during curing. Virtually all of the shrinkage occurs in the thickness dimension and virtually none in the other dimensions. The flexible gasket permits the rigid mold halves to follow through on the shrinking plastic lens during curing. The mold sections are clamped together under pressure during the curing cycle of the resin in order to maintain contact of the mold halves with the resin during curing and help follow through during shrinkage. The resin cures to form the replica surface of the glass mold.

Glass molds are expensive to fabricate because the surfaces in contact with the resin must be optically ground and polished to permit the production of the desired curvature of the finished lens. A relatively long curing time (between 8 and 36 hours) is required to cure the resins conventionally used. The lens manufacturer is therefore forced to maintain a large inventory of duplicate master glass molds to produce a large number of lenses of the same curvature at the same time. When one considers the mold set-up time, the time involved in opening the molds and the time required to clean the molds in preparation for their reuse, in addition to the curing time, it is readily seen that a single mold averages less than one trip per day through a typical manufacturing cycle for an 8-hour working day. It is estimated that a plastic lens manufacturer, who produces a plurality of different lenses, must maintain an inventory of 500,000 glass molds to produce approximately 25,000 plastic lenses daily. In addition, it is estimated that over 500 glass molds must be manufactured each day to replace those lost through accidental breakage and deterioration.

In the pending application, Ser. No. 415,055 mentioned above, there is described a novel process wherein plastic lenses can be manufactured inexpensively without the need for a precision, two-part ground and polished glass mold, without clamping the parts of the mold together, and without a compressible gasket between the mold halves during curing of the resin. This is accomplished by thermally curing the resin in a two-part thermoplastic resinous mold instead of a glass mold. The thermoplastic mold is easily and inexpensively melted and reformed after each lens is cast, thereby eliminating the need for a large inventory of molds. The only inventory required is that of the master lenses used to make the thermoplastic molds.

This method described in Ser. No. 415,055 begins with a master lens of substantially the same curvature as the plastic lens which is to be produced. A two-part (male and female) replica mold for the master lens is then made using a wax-like thermoplastic resinous material to form the two mold sections. The melting temperature of the mold material is above the curing temperature of the resin forming the lens, preferably about 10° to 50° F. above the highest temperature employed in curing the resin.

A metered amount of the liquid, curable thermosetting resin is next poured into the female section of the replica mold. The male section of the mold is positioned over it and in contact with it to complete the mold and force the resin throughout the cavity formed by the two sections of the mold. The mold sections, when assembled, form a cavity conforming to the master lens. This cavity has the desired curvature of the final product, but is greater in thickness than the final product to allow for the shrinkage of the resin during curing.

The filled mold is then heated to cure the resinous lens material. During the initial portion of the heating, the resin starts to polymerize and adhere to the mold surfaces. As it is further cured, the temperature is raised and the resin begins to shrink and harden. As the temperature is raised, the thermoplastic mold material expands slightly and softens to follow the contour of the shrinking lens. When the resinous lens is sufficiently cured, the assembly is cooled to handling temperature, the mold sections are separated and the finished lens is removed. The thermoplastic mold contracts slightly during cooling and can be separated from the finished lens without damaging the surface of the lens. The mold sections are then melted and reformed into new sections to repeat the above procedure.

A unique characteristic of the invention described in Ser. No. 415,055 is that the thermosetting resin material used to fabricate the lens and the thermoplastic resin used to fabricate the replica mold are carefully chosen to be a matched pair. The thermoplastic resin used to make the replica mold is selected to be relatively rigid during initial curing of the thermosetting resin in order to obtain the smooth face and proper curvature and progressively soften after the initial cure as the thermosetting resin used to make the lens is further cured and hardened. This match of the two resins permits the mold to retain its shape during the initial portion of the cure cycle and thereafter to follow the curvature of the shrinking plastic lens. The automatic follow-through of the mold on the shrinking lens prevents the separation of he mold and the lens from taking place. The mold follow-through and adhesion of the mold to the lens permit the desired finished curvatures of the lens to be maintained without the need for a flexible gasket between the male and female sections of the mold or for a clamping means to hold the mold sections together during the cure cycle.

It is believed that the follow-through capabilities exhibited by the matched pair of resins is due to a combination of two factors. The first of these is that as the temperature of the replica mold is increased, the mold tends to soften somewhat to relieve the stresses which may exist between the contracting surfaces of the lens and the expanding replica mold surfaces. The second is that as the temperature of curing increases, there is a slight volume expansion (i.e., about 1 to 5 percent) of the thermoplastic mold material. The exact proportion and degree to which each of these two variables affect the follow-through of the mold on the shrinking lens is not at the present time fully determinable. It is theorized, however, that the majority of this follow-through phenomenon is due to the adhesion of the thermosetting resin to the mold and to the softening of the replica mold material.

In the novel process described in Ser. No. 415,055 as well as in the patented processes referred to above, there are several properties which are tested to determine the acceptability of the product. These are:

(1) Barcol hardness
(2) Dyeability
(3) Surface quality
(4) Abrasion resistance
(5) Power requirements (diopter).

Failure to achieve acceptable standards in any one or more of the above properties can be due to a number of thinks. Lack of a good edge seal during curing creates problems. In the preferred method of making the lenses, a polycarbonate thermosetting resin such as allyl diglycol carbonate is used and it is cured by use of a catalyst such as diisopropyl peroxy dicarbonate. If the seal between the mold halves is not air tight, the catalyst is broken down by oxidation around the perimeter of the lenses and the degree of polymerization is non-uniform across the surface of the lenses.

This non-uniformity of degree of polymerization shows up markedly in the finished product. The hardness of the lenses is not uniform. The lenses accept dyes to a varying degree depending upon the degree of polymerization. The surface quality as viewed in a shadowgraph test is poor. The abrasion resistance is not satisfactory or uniform.

An additional test which is performed on lenses made according to the process described in Ser. No. 415,055 is a visual one to check for the presence of release lines. These release lines may occur in the finished plastic lenses for one of two reasons. The plastic molds may have these lines imposed on their mold surfaces upon release from the glass master surface. They are then carried over to and imposed on the cured thermosetting lenses. Another form of release lines can occur upon separation of the plastic mold from the cured thermosetting lenses.

In accordance with the present invention, the processes described above for making plastic lenses are improved by using one or a combination of the following improvements. Improved plastic lenses are produced by performing the heating and curing step in an atmosphere which is substantially free of oxygen. An inert atmosphere such as nitrogen is preferred. The inert atmosphere is preferably maintained at super-atmospheric pressure, particularly when utilizing the process of Ser. No. 415,055, where thermoplastic molds are employed. Any degree of pressure above atmospheric is helpful, but best results are obtained if the pressure is substantial, i.e., of the order of 30 to 80 pounds per square inch gauge.

In addition, modification of the mold assembly and curing procedure in the process of Ser. No. 415,055 has been found to be helpful. The thermoplastic mold sections are placed together and then sealed substantially completely around their periphery by means of a hot iron or tool. The hot tool is placed against the mold sections and run around the periphery of the mold sections where they meet to soften the plastic and seal the sections together hermetically, with the exception of a small portion which is left unsealed for insertion of the thermosetting resin. The sealed mold is placed in an upright position with the opening for the resin at the highest position. The resin is poured into the mold through the opening and the opening is sealed and the filled mold is thereafter placed in an oven containing a nitrogen atmosphere substantially free of oxygen. The heating and curing is accomplished in this manner with a plurality of molds in the oven at one time in either a batch or a continuous operation.

To better understand the method of the present invention, reference may be had to the accompanying drawings, in which.

Figure 1:
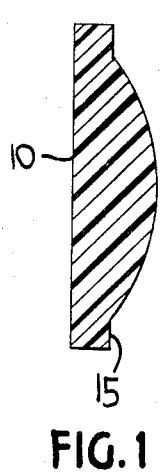
FIGURE 1 is a view in section of the male section of the mold.
Figure 2:
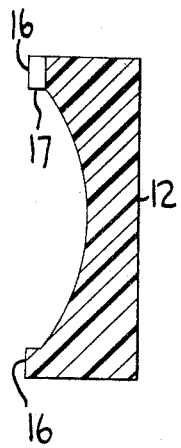
FIGURE 2 is a view in section of the female section of the mold.
Figure 3:
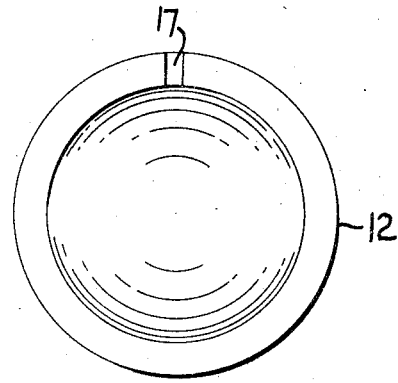
FIGURE 3 is a plan view of the female section of the mold.

The following is a detailed example which represents the best mode contemplated by the inventor for carrying out the present invention.

EXAMPLE I

A ground and polished glass lens is selected as the master lens. The prescription of the single vision uncut master lens is plus 2.00 ± 0.06 diopter, 55 millimeters diameter. The resin selected to constitute the finished lens is allyl diglycol carbonate, hereinafter referred to as CR–39 resin. CR–39 is a registered trademark of Pittsburgh Plate Glass Company for this type of resin.

In a glass beaker, 193.4 grams of the CR–39 resin is placed, to which 6.6 grams (3.3 percent) of diisopropyl peroxy dicarbonate is added as a catalyst. Anhydrous sodium sulphate (2 grams) is added to the catalyzed CR–39 resinous solution to remove any moisture present. The resultant mix is then filtered through a Buchner funnel using No. 1 filter paper, filtering flask and 28 inches of vacuum. The catalyzed CR–39 resin is then stored at 40° F. until used to make the lens.

A mounting ring fabricated from aluminum in the shape of a ring 3 inches in outside diameter and 1 inch high with a wall thickness of 3/16 inch for 3/4 inch of its height and 1/4 inch for the remaining height is used to make the mold section. The variation in wall thickness provides a ledge on the interior of the ring.

To manufacture the male section 10 of the replica mold, the master glass lens is positioned in a ring-like lens holder which is 2⅝ inches in outside diameter, 2 1/16 inches in inside diameter, 1/16 of an inch thick and which has a ledge to center the lens. The master lens and the holder are then positioned in the aluminum ring with the convex surface of the master lens facing down. The method and apparatus for forming the mold sections are illustrated in detail in Ser. No. 415,055.

About 48 grams of molten polyethylene (Epolene C–15) resin heated to about 284° F. is poured into a preheated aluminum ring (130° F.) containing the mounted master lens thereby completely covering the lens. Care is taken not to introduce the Epolene C–15 resin directly onto the master lens. Pouring directly onto the center of the master lens sometimes results in the formation of small pits in the surface of the thermoplastic mold thus formed. The aluminum ring is filled by pouring along the edge onto the lens holder and allowing the Epolene C–15 to flow over the master lens as the desired amount of Epolene C–15 is added. The cast Epolene C–15 male mold section and assembly are placed in an oven for 10 minutes at 130° F. The assembly is then removed from the oven and placed in water at 120° F. for 5 to 7 minutes to bring the thermoplastic mold section to a uniform temperature. The thermoplastic material shrinks during cooling and releases from the lens holder and the walls of the ring. Then the assembly is separated.

To manufacture the female section 12 of the replica mold, the master lens is placed on a lens support on a flat plate with the concave surface facing the plate. The lens support is in the form of a ring having an inner annular sloped, centering ridge to center the lens, and an outer annular ridge to center the mounting ring. The mounting ring is inverted and centered around the master lens and both are preheated to 130° F. Epolene C–15 (about 43 grams) is poured into the ring, again along the edge so as to not introduce the molten Epolene C–15 directly upon the master lens. The ring is only partially filled since it is not necessary to fill the mold completely. The assembly is placed in an oven for 10 minutes at 130° F. The assembly is removed from the oven and placed for 5 to 7 minutes in water at 120° F. as in the manufacture of the male portion of the Epolene C–15 replica mold. The assembly is then separated.

The separation of the thermoplastic mold sections from the master lens is accomplished by using a vacuum cup to grip the master lens. The lens is removed using an eccentric motion to prevent damage to the cast surfaces produced in the mold sections.

Figure 4:
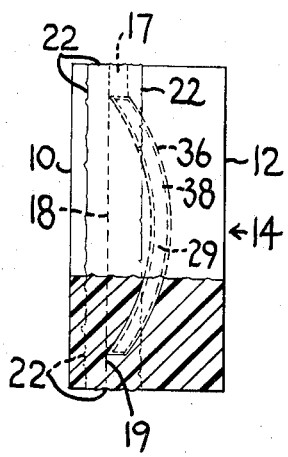
FIGURE 4 is an enlarged elevation, partially in section, of the male and female mold sections prepared according to the invention to receive the thermosetting resin.
Figure 5:
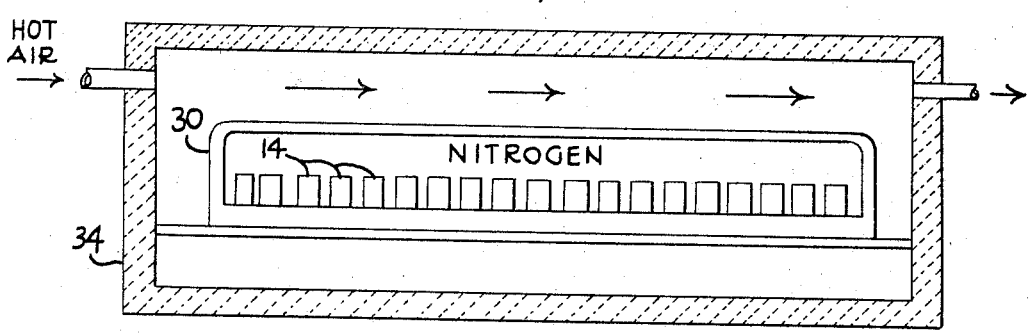
FIGURE 5 is an elevation, partially in section illustrating the method of curing of the thermosetting resin according to the present invention.

The completion of the mold 14 is now described in conjunction with FIGURE 4 of the drawing. The male and female sections, 10 and 12 respectively, of the Epolene C–15 mold 14 are placed in mating relation with the respective peripheral edges 15 and 16 in contact. A hot prong is run around the periphery of the meeting edges to soften and seal edges 15 and 16 together. An opening 17 is left unsealed at one point on the periphery to allow the introduction of resin. The opening 17 is formed originally in the female section during its production as described above. It can be seen at the bottom of FIGURE 4 in the drawing that the vertical line 18 representing the meeting edges 15 and 16 stops at a point 19 which is short of the outer periphery of the molding. The area between the end of the line 18 and the periphery of the mold represents the portion of the meeting edges that is sealed together. The irregular line 22 marks the boundary of the melted and deformed portion of the periphery which has been contacted with the hot tool.

The sealed mold 14 is placed in a vertical position as illustrated in FIGURE 4. By "vertical" is means that the major dimension of the hollow portion 24 of the mold which forms the lenses is mostly in vertical alignment.

The mold is positioned so that the opening 17 is at the top. The resin is then poured into the hollow portion 24 of the mold. The opening 17 is then sealed with a dab of Epolene C–15.

A plurality of filled molds 14 are placed in a vessel 30 which is filled with nitrogen gas at a pressure of 60 pounds per square inch gauge. The sealed vessel 30 is then placed in an oven 34 which is heated by circulating hot air. Heat can be added to the air as it is recirculated in order to control the cure cycle of the resin. The following cure cycle is then followed to make the lenses:

| Time, hrs.:min.: | Temp., °F. |
|---|---|
| 0:00 | 111 |
| 1:00 | 113 |
| 2:00 | 115 |
| 2:50 | 117 |
| 4:05 | 118 |
| 5:45 | 122 |
| 7:05 | 126 |
| 8:15 | 129 |
| 9:20 | 133 |
| 10:05 | 136 |
| 10:45 | 140 |
| 11:25 | 145 |
| 12:00 | 147 |
| 12:30 | 149 |
| 13:00 | 151 |
| 13:30 | 153 |
| 13:50 | 154 |
| 14:10 | 156 |
| 14:30 | 158 |
| 14:50 | 163 |
| 15:10 | 171 |
| 15:40 | 176 |
| 16:10 | 185 |
| 16:30 | 194 |
| 16:50 | End of cycle |

The solid lines 36 on the female and male sections indicate diagrammatically the position of the resin contacting surfaces of the mold sections before curing and the dotted lines 38 indicate the position of these surfaces after curing. At the end of the curing cycle, the mold is removed and allowed to cool in air for several minutes until it reaches approximately 130° F.

The mold is then separated by inserting a knife in between the sealed edges and twisting the blade. The finished lens is removed from the mold sections. Residual Epolene C–15 on the lens is removed with solvent (VM+P Naphtha). After the lens is removed and cleaned, the lens is inspected and found to be of good optical quality as determined by the tests above described, i.e., Barcol hardness, dyeability, surface quality, abrasion resistance and diopter. The plastic lens is then cut along the edge to the outline desired for fitting into the spectacle frame. The uncut lens blank thus produced may also be used as a secondary master lens pattern in place of the glass master lens for future lens production rather than being sold to customer.

CR–39 resin is a water-clear thermosetting resin possessing a unique combination of desirable properties. It has excellent optical clarity, abrasion resistance, dimensional stability, resistance to chemicals and a high use temperature. These enumerated properties, along with other generally good physical characteristics, make CR–39 resin an excellent resin for ophthalmic and optical purposes. This resin and its method of manufacture are disclosed in U.S. Patent No. 2,384,115.

CR–39 resin upon polymerization contracts equally in all directions (volume shrinkage) until it is converted to a more or less solid gel. During the curing of the CR–39 resin, the lateral shrinkage developed in the lens appears to be negligible due to the follow-through of the mold on the lens. The apparent shrinkage occurs mostly in the thickness dimension. The fully cured CR-39 resin shrinkage in the areas in contact with the mold has been found to be almost nil while the shrinkage in the thickness dimension has been found to be about 14 percent.

The structural characteristics of the CR-39 monomer can be seen in the following diagram:

CR-39

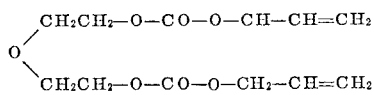

CR-39 (allyl diglycol carbonate) monomer exhibits a low volatility. It contains two unsaturated aliphatic groups which are relatively stable at ordinary temperatures but which polymerize slowly on long standing or if heated to elevated temperatures. If heated in the presence of polymerization catalysts such as peroxide, CR-39 resin monomer readily converts to a thermoset polymer through polymerization of the double bonds.

The most common catalysts which can be used to polymerize CR-39 in the present invention are benzoyl peroxide or isopropyl percarbonate. If benzoyl peroxide is selected, 3 percent by weight is the amount usually used. To obtain the best optical clarity in the finished product, no matter what catalyst is used, the catalyzed CR-39 resin should be filtered. A filter aid such as Magnesol, manufactured by the Magnesol Company of Charleston, W. Va., has been found to be a suitable filter material.

The preferred catalyst of the present invention is isopropyl percarbonate because this catalyst develops an improved optical clarity in the finished CR-39 lens. This catalyst also permits a lower cure temperature cycle to be used. Isopropyl percarbonate, however, is unstable at room temperature, and in order to prevent its rapid and destructive decomposition, it must be stored at a temperature not above 0° F. Because of this requirement, the transportation and handling of isopropyl percarbonate introduces problems of refrigeration. This catalyst and details of its use are disclosed in U.S. Patent No. 2,464,062.

Catalyzed CR-39 (allyl diglycol carbonate) will gel due to polymerization after about two weeks at room temperature. However, catalyzed solution may be stored for several months with little change if kept refrigerated.

Various suitable curing cycles have been developed for CR-39 (allyl diglycol carbonate) catalyzed with 3.0 percent diisopropyl peroxydicarbonate. These curing cycles vary depending upon the thickness of the CR-39 article being cured. Typical curing cycles are presented as follows:

DIISOPROPYL PEROXYDICARBONATE CATALYST, 3.0%

| Less than 1/16 Inch Thick | | 1/16 to 1/8 Inch Thick | | 1/8 to 3/8 Inch Thick | |
|---|---|---|---|---|---|
| Time, hrs.:min. | Temp., °F. | Time, hrs.:min. | Temp., °F. | Time, hrs.:min. | Temp., °F. |
| 0:00 | 113 | 0:00 | 115 | 0:00 | 111 |
| 0:30 | 115 | 0:50 | 117 | 1:00 | 113 |
| 1:10 | 117 | 2:05 | 118 | 2:00 | 115 |
| 2:15 | 118 | 3:45 | 122 | 2:50 | 117 |
| 3:30 | 120 | 5:05 | 126 | 4:05 | 118 |
| 4:15 | 122 | 6:15 | 129 | 5:45 | 122 |
| 5:10 | 124 | 7:20 | 132 | 7:05 | 126 |
| 5:45 | 126 | 8:05 | 136 | 8:15 | 129 |
| 6:15 | 127 | 8:45 | 140 | 9:20 | 133 |
| 6:45 | 129 | 9:25 | 145 | 10:05 | 136 |
| 7:30 | 131 | 10:00 | 147 | 10:45 | 140 |
| 8:00 | 132 | 10:30 | 149 | 11:25 | 145 |
| 8:25 | 134 | 11:00 | 151 | 12:00 | 147 |
| 8:40 | 136 | 11:30 | 153 | 12:30 | 149 |
| 9:00 | 138 | 11:50 | 154 | 13:00 | 151 |
| 9:15 | 140 | 12:10 | 156 | 13:30 | 153 |
| 9:30 | 142 | 12:30 | 158 | 13:50 | 154 |
| 9:55 | 145 | 12:50 | 162 | 14:10 | 156 |
| 10:25 | 151 | 13:10 | 171 | 14:30 | 158 |
| 10:40 | 154 | 13:40 | 176 | 14:50 | 163 |
| 11:00 | 159 | 14:10 | 185 | 15:10 | 171 |
| 11:15 | 165 | 14:30 | 194 | 15:40 | 176 |
| 11:35 | 177 | 14:50 | 221 | 16:10 | 185 |
| 11:45 | 194 | 15:00 | (*) | 16:30 | 194 |
| 12:00 | (*) | | | 16:50 | 221 |
| | | | | 17:00 | (*) |

*End of Cycle.

A typical curing cycle for CR-39 resin catalyzed with 3 percent benzoyl peroxide is as follows:

| Time, hours: | Temperature,[1] °F. |
|---|---|
| 0.00 | 167 |
| 5:00 | 176 |
| 8:00 | 189 |
| 12:00 | End of cycle |

[1] Oven temperature in an air oven.

Other details concerning curing of CR-39 resin are set forth in an article entitled "Polymerization Control in Casting a Thermosetting Resin" which was published in vol. 47, page 2447, December 1955 issue of Industrial and Engineering Chemistry.

The preferred mold material of the present invention is Epolene C-15. Epolene C-15 is the trade name of a low molecular weight, non-emulsifiable polyethylene resin manufactured by Eastman Chemical Products Corporation. Epolene C-15 has been widely used in wax blending applications because of its low cloud point, flexibility and resistance to thermal shock cracking. It imparts high gloss, scuff resistance and improved resistance to low temperature delamination when used as a modifier in various products.

Epolene C-15 has the following properties:

| | |
|---|---|
| Molecular weight | 3500 |
| Density at 77° F., grams/cubic centimeter | 0.983 |
| Viscosity cps. at 284° F. | 6300 |

Hardness, Shore A:
| | |
|---|---|
| 78° F. (initial) | 97 |
| 78° F. (15 sec.) | 97 |
| 130° F. (initial) | 90 |
| 130° F. (15 sec.) | 86 |
| Ring and ball softening point, °F. | 207 |
| Linear coefficient of thermal expansion (inches per °F. up to melting temperature) | $10.5 \times 10^{-5}$ |

The present invention is not restricted to the preferred CR-39 and Epolene C-15 matched combination of resins disclosed in the preferred embodiment of Example I. Many other compatible combinations of thermoplastic molding materials and thermosetting resins can be devised within the scope of the present invention by one skilled in the art of resins.

In addition to CR-39 (allyl diglycol carbonate) as the castable resin, the following materials may be used. The unsaturated alcohol esters of simple polybasic acids such as diallyl phthalate, diallyl maleate, diallyl fumarate, diallyl succinate, diallyl carbonate, diallyl crotonate, diallyl benzoate, diallyl diglycolate, and any other of the many resins that will copolymerize with CR-39 resin, such as dimethallyl phthalate, glycol dimethacrylate, propylene glycol, vinyl acetate, and methyl methacrylate as indicated in U.S. 2,384,115.

These materials may be cast alone or in all proportions with CR-39 resin. Styrene may also be used, but amounts in excess of about 5.0 percent by weight tend to develop clouding of the cast resin which destroys the optical clarity of the cast element. This list of substitute resins for CR-39 is not intended to be all inclusive, but merely serves to point out some of the many alternate materials suitable. Many other castable resins will become apparent to one skilled in the art.

Some thermoplastic resinous materials which can be used as mold materials for those manufactured and sold by Eastman Chemical Products Company of Kingsport, Tennessee, under the trademark Epolene. These are low molecular weight polyolefins listed below by their trademark and numerical designation.

| Trade Name Epolene | Ring and Ball Softening Point, °F. | Molecular Weight Approximate |
|---|---|---|
| E-10 | 221 | 2,500 |
| E-11 | 214.1 | 1,500 |
| E-12 | 224.6 | 1,500 |
| E-13 | 221 | 2,500 |
| E-14 | 213.8 | 1,400 |
| N-10 | 231.8 | 2,500 |
| N-11 | 225.5 | 1,500 |
| C-10 | 217.4 | 7,000 |
| C-12 | 197.6 | 3,700 |
| C-15 | 207 | 3,500 |

Certain polyethylenes manufactured by Allied Chemical Corporation of New York, New York, are also useful as mold materials. The table below lists several low molecular weight polyolefins having an OH or ether group at the end of their chain, by their respective trademarks.

| Trademark A-C Polyethylene Grade | Molecular Weight Approximate | Melting Point, °F. |
|---|---|---|
| 6+6A | 2,000 | 219-226 |
| 7 | 2,000 | 223-230 |
| 615 | 5,000 | 224-232 |
| 617-617A | 1,500 | 210-217 |
| G-201 | 2,000 | 201-208 |

Other possible alternative mold materials, but by no means all of the possible castable wax-type resins, are:

Acrawax C—Manufactured by Glyco Chemicals Incorporated of New York, New York, which is a reaction product of hydrogenated castor oil and monoethanolamine having a melting point of 284° F.;

Adogen—Manufactured by Archer Daniels-Midland Company of Minneapolis, Minnesota, which is a stearyl amide having a melting point between 212 and 219° F.;

Carlisle Wax—Manufactured by Carlisle Chemical Works of Reading, Ohio, which is a group of amide types of waxes having melting points between 223 and 400° F.;

Halocarbon Wax—Manufactured by Union Carbide Corporation of New York, New York, which are saturated low-molecular weight polymers of chlorotrifluoroethylene having the general formula—$(CF_2CFCl)_n$—

Santowaxes—Manufactured by Monsanto Chemical Company of St. Louis, Missouri, which are solid hydrocarbons (ortho, meta and para-terphenyls) having melting points between a little over room temperature and 410° F.

In addition to the preferred catalysts, isopropyl percarbonate and benzoyl peroxide, other catalysts such as acetyl peroxide, diethyl percarbonate, allyl percarbonate, acetone peroxide and ethyl peroxide may be used. Many other suitable catalysts will also become apparent to one skilled in the art depending upon the particular thermosetting resin employed to form the lens.

EXAMPLE II

The following mold material is an example of a blend of a polyolefin and another material which gives superior results. A mixture of Epolene C-15 and paraffin wax in a ratio of 100 to 10 parts by weight is prepared by melting the materials and blending them together with stirring at a temperature of 284° F.

The addition of paraffiin wax to the polyethylene material reduces the melt viscosity by about 43 percent, but still provides the same hardness characteristics to the mold material as can be seen in the following table:

TABLE 1

| Property | Epolene C-15 | | Epolene C-15 Plus Paraffin | |
|---|---|---|---|---|
| Brookfield Viscosity, 284 °F | 6.3×10³ | | 3.6×10³ | |
| | Initial | 15 Sec. | Initial | 15 Sec. |
| Hardness, Shore A: | | | | |
| 78° F | 97 | 97 | 97 | 97 |
| 130° F | 90 | 86 | 92 | 92 |

This provides improvement in the reproducibility of process, i.e., the ability to make a plurality of lenses having the same physical and optical properties.

The addition of paraffin wax to the polyethylene can be made in various amounts depending upon the viscosity properties desired. Mixtures containing from 0.1 to 30 percent by weight of wax based upon the weight of the mixture are useful. The molecular weight range of polyolefin is about 1000 to 8000. The mixture provides a method to control the melt viscosity of the mold material and tailor it to the particular thermosetting resin being formed into the lenses.

The overwhelming advantage of the present invention is its economics, which is primarily the result of eliminating the large inventory of master molds required. The master molds, since they are presently fabricated of glass and are optically ground and polished, are very expensive to manufacture. The very much smaller inventory of master lens patterns required in the present invention greatly reduces the capital outlay.

The second economic advantage is that the resinous mold material is relatively inexpensive and can be used over and over again to produce molds.

A third economic advantage which is also a significant advance over the prior art is the elimination of the flexible gasket between the mold halves. The gasket was previously required to allow for follow-through of the rigid glass mold on the curing plastic lens. This problem of follow-through, which has always perplexed the manufacturers of plastic lenses, has now been solved.

The present invention is timely because the use of plastic lenses is on the increase. Plastic lenses are desirable because they are essentially unbreakable and shatterproof. They are thus suitable for children's glasses and for safety lenses. Plastic lenses of comparable prescription are much lighter than conventional glass lenses and so are more comfortable to wear. This lighter weight of plastic lenses is especially advantageous for those individuals who must wear cataract or similar lenses which, when made out of glass, are quite thick and heavy, making them uncomfortable to wear.

The use of CR-39 resin has further increased the popularity of plastic lenses because CR-39 resin exhibits a very high scratch resistance.

The present method of producing plastic optical and ophthalmic lenses is capable of producing single, bifocal, trifocal, or any other multiple compound lens. Any lens which can be fabricated out of glass can also be fabricated of plastic in accordance with the method herein disclosed.

It is also within the scope of the present invention to produce tinted plastic lenses with or without a prescription. One of the desirable properties of the preferred resin CR-39 is that it readily takes a colored dye. The method of producing a plastic colored lens requires only the additional step of dipping the plastic lens into a suitable dye of the desired color for a few seconds to cause diffusion of the color into the surface of the lens.

The method disclosed in the present invention also is not limited merely to the manufacture of plastic optical or ophthalmic lenses. The method can be readily adapted to the manufacture of camera lenses, binocular prisms, contact lenses or any other article which may be made of plastic.

While the present invention has been described with respect to a particular method of manufacture, various modifications within the scope of the present invention can be readily devised. The scope of the present invention should only be limited by the language of the appended claims.

What is claimed is:

1. A method of producing lenses which comprises producing a two-part replica mold of two master lens surfaces by casting a thermoplastic resinous material about the master lens surfaces in two separate casting steps, separating the two resinous replica mold parts from the master lens surfaces, joining the parts to form a mold cavity, locally heating the meeting portions of the mold parts substantially completely around the periphery of mold to hermetically seal all but a small opening in the periphery, introducing a measured amount of a heat curable thermosetting resin into the replica mold through said opening, heating the filled mold to cure the thermosetting resin, and separating the mold from the cured resinous lens.

2. The method of claim 1 wherein the mold is placed in a vertical position with the opening at the top prior to filling and thereafter is placed in an oven in the same position for curing in a gaseous atmosphere which is substantially free of oxygen and which is at super-atmospheric pressure.

3. The method of claim 1 wherein the thermoplastic resinous material is a solid mixture of a polyolefin and a wax containing up to about 30 percent by weight of wax based upon the weight of the mixture.

4. The method of claim 1 wherein the heat-curable, thermosetting resin comprises unsaturated alcohol esters of simple polybasic acids.

5. The method of claim 4 wherein unsaturated alcohol ester is allyl diglycol carbonate.

References Cited

UNITED STATES PATENTS

| 2,542,386 | 2/1951 | Beattie | 264—1 |
| 2,962,767 | 12/1960 | Trojanowski | 264—313 |
| 2,964,501 | 12/1960 | Sarofeen | 264—1 |
| 3,014,614 | 12/1961 | Carroll et al. | 264—313 |
| 2,965,946 | 12/1960 | Sweet et al. | 264—337 |

OTHER REFERENCES

Riddle: Monomeric Acrylic Esters, 1954, pp. 38 and 39.

JULIUS FROME, *Primary Examiner.*

A. KOEKERT, *Assistant Examiner.*

U.S. Cl. X.R.

264—85, 221, 225, 317, 337, 37; 260—28.5; 18—39, 47